No. 813,900. PATENTED FEB. 27, 1906.
E. LAPISSE.
PROTECTING DEVICE FOR PNEUMATIC TIRES.
APPLICATION FILED SEPT. 2, 1905.
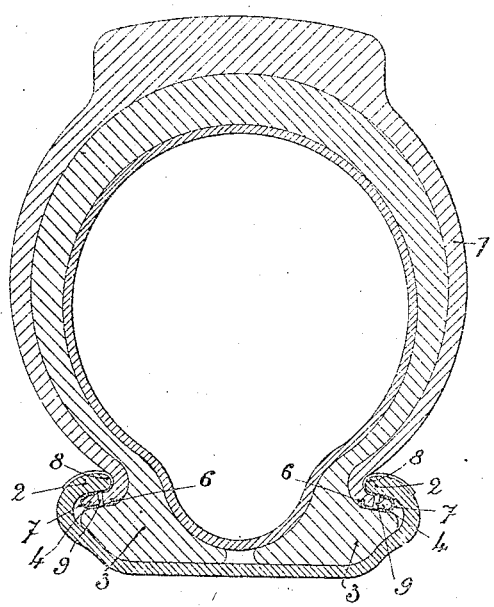
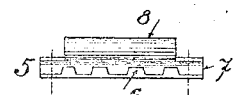
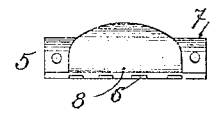
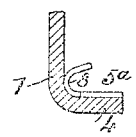
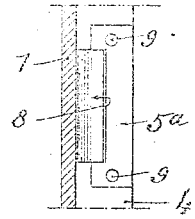
Witnesses:
Inventor,
Emile Lapisse.
by
Attorneys.

UNITED STATES PATENT OFFICE.

EMILE LAPISSE, OF ELBEUF, FRANCE.

PROTECTING DEVICE FOR PNEUMATIC TIRES.

No. 813,900.  Specification of Letters Patent.  Patented Feb. 27, 1906.

Application filed September 2, 1905. Serial No. 276,828.

*To all whom it may concern:*

Be it known that I, EMILE LAPISSE, manufacturer, a citizen of the Republic of France, residing at Elbeuf, 9 Rue de la Barrière, Seine-Inférieure Department, in the Republic of France, have invented certain new and useful Improvements in Protecting Devices for Pneumatic Tires, of which the following is a specification.

This invention relates to protecting devices for pneumatic tires; and it has for its object to so construct a contrivance of this character that it shall comprise on its edges, provided for that purpose with flat flanges, hooking devices of peculiar shape designed to secure the same to the cover of the pneumatic tire, while avoiding the wear and tear to which the protecting devices now in use are subjected on account of the continuous strain to which the usual hooking and fixing devices give rise.

In the accompanying drawings, which show, by way of example, two embodiments of this invention, Figure 1 is a cross-sectional view of a pneumatic tire provided with a protecting device having flanges or heels and hooks. Figs. 2 and 3 are respectively an elevation and a plan view of a hook. Figs. 4 and 5 are a sectional and a plan view of a portion of a protecting device provided with hooks of another shape.

As shown in Fig. 1, the protecting device 1 is of sufficient width to allow of its edges being engaged between the flanges 2 of the rim and the flanges 3 of the cover of the pneumatic tire. The said edges are provided with flat flanges 4, extending along the whole of the circumference and outwardly at right angles, or nearly so, with respect to the lateral portions of the protecting device. Fig. 1 shows how the said flanges 4 are nipped between the flanges 2 of the rim and the flanges or heels 3 of the cover of the pneumatic tire. In each of the edges are secured at intervals metal hooks 5, designed to be applied against the flanges 2 of the rim in order to hold or maintain the protecting device in place. Each hook 5 (see Figs. 2 and 3) consists of a plate, preferably of sheet-steel, so bent as to be of S or 2 shape in cross-section. One of the edges of the said plate is provided with teeth 6, designed to penetrate into the material of the protecting device in order to secure the hook in the same. For that purpose the flange of the protecting device is engaged in the bight 7 of the hook, and then the bight is closed down, as shown in Fig. 1. The other bight 8 lies at the outside of the protecting device and must be engaged on the flange 2 of the rim. The lower portion 7 is, moreover, prolonged laterally beyond the teeth 6 to provide room for two rivets 9, which complete the devices for securing the hook onto the protecting device.

When the pneumatic tire is mounted, the portion 7 of the hook is securely clamped between the flange 2 of the rim and the flange or heel 3 of the cover of the pneumatic tire, and it is prevented from swinging by the outer bight 8, which abuts exactly on the flange 2.

It will be understood that as the portion of the protecting device to which the hooks are secured is held against movement in any direction it is not subjected to strain and wear, as in the case of the protecting devices now in use.

In the modified form shown in Figs. 4 and 5 the hook $5^a$ is J-shaped. Its single bight 8 is designed to abut on the flange of the rim in exactly the same manner as in the previous case. The said hook is secured by its flat portion on the edge of the protecting device by means of rivets 9. When the protecting device is engaged between the rim and the flanges or heels of the cover of the pneumatic tire, the hooks thus arranged play absolutely the same part as the hooks 5, described in reference to Figs. 1 and 2, and insure the same advantages.

The invention is applicable to all kinds of protecting devices whatever may be the material from which they are made, the nature of their tread, their inner or outer mountings, &c. On leather protecting devices the flanges 4 may be produced by any suitable stamping process, or they may be prepared separately and then secured to the edges of the protecting device by stitching, riveting, or the like. In the case of rubber protecting devices the said flanges are preferably obtained integral with the protecting device when molded; but they may also be attached to the edges of the protecting device. Finally, the invention is applicable also to those protecting devices in parts called "sleeves" or "gaiter-sleeves" and which are used to cover a damaged part of the pneumatic tire.

I claim—

1. A protecting device for pneumatic tires, formed by a strip of suitable material which is of sufficient width to wrap the cover of the pneumatic tire and to be secured between the flange of the rim and the flange of the said cover, and which is provided with flat heels practically at right angles with respect to the lateral portions; and hooking devices each composed of a metal plate having an outwardly-opening bight abutting on the flange of the rim of the wheel and provided with means by which it is secured to the flange of the protecting device.

2. A protecting device of a width enabling it to wrap the cover of the pneumatic tire, flanges formed at right angles on its edges to be nipped between the flange of the rim and the flange of the cover, and hooking devices each formed of a metal plate provided with a bight to abut on the flange of the rim and with a second bight to abut on the flange or heel of the protecting device, with means for securing the second bight on the protecting device.

3. In vehicle-wheels provided with pneumatic tires, a protecting device of sufficient width to be enabled to wrap the pneumatic tire, flanges formed at right angles on its edges, and hooking devices each formed of a metal plate provided with two bights opening in opposite directions, the one to abut on the flange of the protecting device, and the other and wider bight to abut on the flange of the rim of the wheel.

4. In a vehicle-wheel having a pneumatic tire, a hook to secure on the rim a protecting device provided with flanges, which hook is formed of a metal plate provided with a bight to abut on the rim of the wheel and with a second bight to abut on the flange of the protecting device, with rivet-holes and teeth to secure the same on the protecting device.

5. The combination with the rim of a vehicle-wheel having inwardly-extending flanges at its side edges, a pneumatic tire and cover for the same, which cover is provided with outer side flanges at its bottom portion, facing the flanges of the rim, a protective device for the tire, formed of suitable material of sufficient width to wrap the cover of the tire and having its lower edges carried out and held between the flanges of the tire cover and rim, and hooking devices each composed of a metal plate having an outwardly-opening bight which receives a flange of the rim, and means for attaching the plate to the protecting device where said device is located between the rim and the cover flanges.

6. A vehicle-wheel having forwardly-extending flanges at its outer side edges, a pneumatic tire having outwardly-extending side flanges located beneath the flanges of the rim, a protective covering for the tire, having its longitudinal edges carried outward and nipped between the flanges of the rim and the flanges of the tire, and locking devices for the protective covering, consisting of metal plates provided with bights which receive the flanges of the rim and bights which receive the longitudinal edges of the protective covering, and means for securing the second bights to the said protective covering.

In testimony that I claim the foregoing as my invention I have signed my name in presence of two subscribing witnesses.

EMILE LAPISSE.

Witnesses:
FRANCOIS DALIGAULT,
MAURICE ROUX.